(12) United States Patent
Blandford et al.

(10) Patent No.: US 7,862,727 B2
(45) Date of Patent: Jan. 4, 2011

(54) DESALINATION SCALE INHIBITORS

(75) Inventors: Nicholas R. Blandford, Willow Grove, PA (US); Libardo A. Perez, The Woodlands, TX (US); William S. Carey, Wallingford, PA (US)

(73) Assignee: General Electric Company, Schenectady, NY (US)

( * ) Notice: Subject to any disclaimer, the term of this patent is extended or adjusted under 35 U.S.C. 154(b) by 494 days.

(21) Appl. No.: 10/597,925

(22) PCT Filed: Sep. 24, 2004

(86) PCT No.: PCT/US2004/031365

§ 371 (c)(1),
(2), (4) Date: Sep. 13, 2006

(87) PCT Pub. No.: WO2005/082793

PCT Pub. Date: Sep. 9, 2005

(65) Prior Publication Data

US 2008/0223790 A1 Sep. 18, 2008

Related U.S. Application Data

(60) Provisional application No. 60/544,667, filed on Feb. 13, 2004.

(51) Int. Cl.
*C02F 5/14* (2006.01)

(52) U.S. Cl. .......................... 210/699; 203/7; 210/701; 252/180

(58) Field of Classification Search .................. 210/699
See application file for complete search history.

(56) References Cited

U.S. PATENT DOCUMENTS

| | | | | |
|---|---|---|---|---|
| 4,001,134 | A | * 1/1977 | Markofsky et al. | .......... 252/180 |
| 4,204,953 | A | 5/1980 | Hodgson et al. | |
| 4,342,652 | A | * 8/1982 | Schiller et al. | .............. 210/698 |
| 4,446,028 | A | 5/1984 | Becker | |
| 4,446,046 | A | 5/1984 | Becker | |
| 5,087,376 | A | 2/1992 | Bendiksen et al. | |
| 5,512,183 | A | 4/1996 | Boyette et al. | |
| 6,071,434 | A | * 6/2000 | Davis et al. | .............. 252/389.2 |

* cited by examiner

*Primary Examiner*—Peter A Hruskoci
(74) *Attorney, Agent, or Firm*—GE Global Patent Operation; Peter T. DiMauro

(57) ABSTRACT

A method and composition for processing natural water such as seawater, brackish, and estuarine water wherein the water is concentrated with or without heating comprising adding to the water (I) a water-soluble polymeric phosphonate and (II) a water-soluble polycarboxylate to control scale formation and deposition. Optionally a water-soluble poly[isopropenylphosphonic acid] can also be utilized as component (I) without the addition of component (II).

8 Claims, No Drawings

DESALINATION SCALE INHIBITORS

CROSS REFERENCE TO RELATED APPLICATION

This application claims the priority benefit of U.S. Provisional Patent Application Ser. No. 60/544,667 filed Feb. 13, 2004.

FIELD OF THE INVENTION

The present invention pertains to a composition and method of utilizing the same to control the formation and deposition of scale imparting compounds in water systems and, more particularly, to prevent scale deposition in desalination operations.

BACKGROUND OF THE INVENTION

The processing and or utilization of natural water in systems wherein the water is concentrated with or without heating can result in the formation of insoluble salts. These precipitated salts are troublesome in the systems in that they can lead to scale formation that negatively impacts operational efficiency. For example, in the processing of natural waters such as seawater, brackish, and estuarine water by desalination techniques such as thermal multistage flash distillation (MSF) or reverse osmosis to yield potable water, salts including calcium carbonate, magnesium hydroxide, and calcium sulfate have a tendency to precipitate and form scale deposits on the surfaces of the processing equipment. These scale deposits interfere with the operational efficiency of the systems by obstructing water flow, impeding heat transfer, and inducing localized corrosion that can result in unscheduled maintenance shutdowns and shortening of the service life of the equipment.

Numerous methods to mitigate scale formation in fresh water recovery systems are known to those skilled in the art. For examples see Dunseth et al., *Ind. & Eng. Chem.* 56, 56 (1964) and the background of the invention of Desai in U.S. Pat. No. 4,200,500.

One common method to prevent scale formation in desalination systems is the practice of acid doping. While effective, this method also has disadvantages of accelerating corrosion processes due to the resulting low pH of the natural water, is not effective in controlling calcium sulfate scale, and there are safety issues in handling large quantities of acid.

Another method to prevent scale formation in desalination systems is the addition of additives in the form of polymers to the natural water at levels substoichiometric to the amount of hardness ions present in the natural water.

Salutsky in U.S. Pat. No. 3,444,054 teaches a method for treating saline evaporator waters to prevent scale formation on the heat transfer surfaces by the addition of a water-soluble poly[methacrylic acid]. It is further taught that the saline waters can contain other treatment agents such as antifoam agents, corrosion inhibitors, oxygen scavengers and the like if they are compatible with the poly[methacrylic acid].

Jones et al. in U.S. Pat. No. 3,810,834 teaches a method for controlling scale formation in aqueous systems, including thermal and reverse osmosis processes, by the addition of a water-soluble poly[maleic acid]. An additional benefit noted is that if scale formation does occur the precipitates crystal structures are modified in such a way that they are easily removed. It is further taught that the poly[maleic acid] of the invention can be utilized in conjunction with other conventional water-treatment agents including phosphonate-type threshold agents, antifoams, and corrosion inhibitors.

Desai in U.S. Pat. No. 4,200,500 teaches a method to prevent deposition of calcium and magnesium scale in the desalination of seawater by the addition of substoichiometric amounts of the hydrolyzed reaction product of maleic anhydride and a polyunsaturated long-chain fatty acid component.

Smith et al. in U.S. Pat. Nos. 4,046,707 and 4,105,551 teaches a method of inhibiting the precipitation of scale forming salts comprising adding to the system a telemetric compound derived from polymerization of a vinylic carboxylic acid in the presence of a phosphorous acid chain transfer agent. It is further taught that the telomer of the inventions can be used in conjunction with other compounds know to be useful in water treatment; e.g., dispersing and threshold agents, precipitating agents, oxygen scavengers, sequestering agents, antifoam agents, and corrosion inhibitors.

Hodgson et al. in U.S. Pat. No. 4,204,953 teaches a method for inhibiting deposition of scale from saline water onto the exchanger surface by utilizing a scale inhibiting additive in conjunction with a mineral acid to neutralize part of the bicarbonate alkalinity. Examples of scale inhibiting additives are polyphosphates, poly(meth)acrylates, phosphonates, aminophosphonates, and polymeric carboxylic acids such as poly[maleic acid].

Logan et al. in EP 0089189 teach an inhibitor of the formation of calcium carbonate, magnesium hydroxide, and calcium sulfate scale comprising a mixture of poly[maleic acid], phosphonic acid, and a hydroxy acid iron sequestrants.

Logan et al. in U.S. Pat. No. 4,634,532 teaches a process for controlling the formation of seawater scale comprising adding to the seawater a water-soluble orthophosphate and at least one water-soluble polycarboxylate, phosphonate, or sulfonate copolymer.

Becker in U.S. Pat. Nos. 4,446,028 and 4,446,046; and Boyette et al. in U.S. Pat. No. 5,512,183 teaches homo- and copolymers of isopropenylphosphonic acid. These compositions are taught to be effective in inhibiting corrosion and scale formation in aqueous water systems such as cooling and boiler system. There is no indication that these compositions would be effective in treating desalination operations or that they would be effective in controlling magnesium hydroxide scaling typical of desalination operations.

Cady et al. in U.S. Pat. No. 5,519,102 teach a method for the preparation of homopolymers of isopropenylphosphonic acid in an aqueous solvent.

In spite of these advances operators of desalination facilities continue to utilize acid to control the pH of the system and, for thermal deslination units, limit the operation temperature to minimize concerns of scale deposition. Of particular concern is the formation of magnesium hydroxide scale in thermal desalination operations. There is therefore a need in this field for a composition that can be added to the aqueous system that control the formation of scale forming species such as magnesium hydroxide without the need for acid addition. Furthermore it is desirable to be able to operate thermal desalination units at higher temperatures to improve their efficiency.

DETAILED DESCRIPTION OF THE INVENTION

The present invention is directed to a process for the control of scale formation and deposition in water systems, particularly thermal and reverse osmosis desalination operations, comprising adding to the water (I) a water-soluble polymeric phosphonate and (II) a water-soluble polycarboxylate.

Optionally a water-soluble poly[isopropenyl-phosphonic acid] can also be utilized as component (I) without the addition of component (II).

In another aspect, the present invention provides a composition and method for controlling scale deposition in desalination operations without the use of acid.

In a further aspect, the present invention provides a composition and method for controlling scale deposition, particularly magnesium hydroxide, in thermal desalination operations without the use of acid and thereby allowing the unit to operate at higher, more efficient temperatures.

The general structure of the water-soluble polymeric phosphonate (I) of the invention is provided in Formula I.

$$-[B\text{-co-}F]_n-\qquad\text{Formula I}$$

Polymer segment B of Formula I is the repeat unit formed after polymerization of one or more phosphonate containing monomers. Exemplary monomers encompassed by B include, but are not limited to, vinyl phosphonic acid (VPA), isopropenylphosphonic acid (IPPA), isopropenylphosphonic anhydride (IPPAnhy), allylphosphonic acid, ethylidenediphosphonic acid, vinylbenzylphosphonic acid, 2-(meth)acrylamido-2-methylpropylphosphonic acid, 3-(meth)acrylamido-2-hydroxypropylphosphonic acid, 3-allyoxy-2-hydroxypropylphosphonic acid, mixtures of any of the foregoing and the like.

Polymer segment F of Formula I, when present, is the repeat unit formed after polymerization of one or more non-phosphonate containing monomers. Exemplary monomers encompassed by F include, but are not limited to, carboxylic acid monomers such as (meth)acrylic acid, maleic acid, itaconic acid, acrylamidoglycolic acid; sulfonic acid monomers such as 2-(meth)acrylamido-2-methylpropylsulfonic acid, 3-(meth)acrylamido-2-hydroxypropylsulfonic acid, 3-allyoxy-2-hydroxypropyl-sulfonic acid, vinylsulfonic acid, vinylbenzylsulfonic acid, and allyloxybenzylsulfonic acid; non-ionic monomers such as (meth)acrylamide, t-butylacrylamide, vinyl acetate, 1-allyloxy-2,3-propanediol, hydroxypolyethoxy(10) allyl ether; sulfate and phosphate ester analogs of hydroxy containing monomers such as allylpolyethoxy(10) sulfate; mixtures of any of the foregoing and the like.

The term "co" of Formula I is a designation for a polymer system with an unspecified arrangement of two or more monomer components. The molar ratio of B:F may fall within the range of 100:0 to 5:95. In cases where the water-soluble polymeric phosphonate (I) of the invention is devoid of the polymer segment F, the general structure is provided in Formula II wherein B is as previously described. It is also to be understood that polymer segments B and F may consist of more than one kind of monomer.

$$-[B]_n-\qquad\text{Formula II}$$

In a preferred embodiment of the invention the water-soluble polymeric phosphonate (I) segment B is the repeat unit formed after polymerization of vinylphosphonic acid, isopropenylphosphonic acid, isopropenylphosphonic anhydride, and mixtures thereof; segment F is the repeat unit after polymerization of acrylic acid, maleic acid, and mixtures thereof; and the molar ratio of B:F is from 100:0 to 25:75.

In a particularly preferred embodiment of the invention the water-soluble polymeric phosphonate (I) segment B is the repeat unit formed after polymerization of isopropenylphosphonic acid, isopropenylphosphonic anhydride, and mixtures thereof; and the composition is devoid of the segment F. An example of such a composition is provided in Example 1 of Cady et al. U.S. Pat. No. 5,519,102 wherein a mixture of isopropenylphosphonic acid and isopropenylphosphonic anhydride are polymerized together via an aqueous polymerization technique.

The water-soluble polymeric phosphonate (I) of the present invention may be prepared via free radical polymerization technique known to those skilled in the art, for example see Allcock and Lampe, *Contemporary Polymer Chemistry*, Englewood Cliffs, N.J., PRENTICE-HALL, 1981, Chapter 3.

Preferably the polymerization is conducted in an aqueous solution employing a water-soluble free radical initiator. Preferred classes of water-soluble free radical initiators including, but not limited to, the persulfates such as sodium persulfate, azos such as 2,2'-azobis(2-amidinopropane) dihydrochloride, peroxides such a hydrogen peroxide, and redox pairs such as sodium bisulfite and sodium persulfate.

Any of the chain transfer reagents known to those skilled in the art may be used to control the molecular weight. Those include, but are not limited to, alkyl alcohols such as isopropanol, mercaptans such as 3-mercaptopropionic acid, phosphites such as hypophosphorous acid, allyl alcohol, and the like.

Branching agents such as methylenebisacrylamide, polyethyleneglycol diacrylate, and the like may optionally be utilized in the polymerization. The level of branching agent utilized is limited to that which yields water-soluble.

The optimal molecular weight of the water-soluble polymeric phosphonate (I) of the present invention will be dependent on factors including its composition. In general, it is known to those skilled in the art that polymers effective in inhibiting scale formation in aqueous systems may fall within the range Mw of about 500 to 100,000. Preferably the Mw ranges from about 500 to 50,000 and most preferably from about 500 to 25,000. The essential criterion is that the polymer is water-soluble.

It is to be understood that the aforementioned polymerization methods do not in any way limit the synthesis of the water-soluble polymeric phosphonate (I) of the present invention.

The water-soluble polycarboxylates (II) of the present invention are scale inhibiting additives known to those skilled in the art including homo- and copolymers of (meth)acrylic acid, maleic acid or anhydride, itaconic acid, acrylamidoglycolic acid, mixtures thereof and the like. It is to be understood that said copolymers can also comprise sulfonic and non-ionic monomers and mixtures thereof. Exemplary water-soluble polycarboxylates (II) are disclosed in Jones et al. U.S. Pat. No. 3,810,834; Smith et al. U.S. Pat. No. 4,046,707; Chen U.S. Pat. No. 4,659,481; Logan et al. U.S. Pat. No. 4,634,532; Brown et al. U.S. Pat. No. 5,062,962; Hughes et al. U.S. Pat. No. 5,077,361; and Chen et al. U.S. Pat. No. 6,444,747.

Preferred water-soluble polycarboxylates (II) of the present invention are those derived by polymerization of maleic acid or anhydride.

Particularly preferred water-soluble polycarboxylates (II) of the present invention are commercially available maleic polymers including, but not limited to, Rohm and Haas ACUMER® 4210; Ciba-Geigy BELCLENE® 283, BASF SOKALAN® PM 10 I, and ALCO Chemical AQUA-TREAT® AR-801.

The composition of the present invention comprising (I) a water-soluble polymeric phosphonate and (II) a water-soluble polycarboxylate (hereinafter referred to as "composition (I)/(II)") is added to the natural water for which scale formation and deposition is desired in an amount effect for the purpose. This amount will vary depending on the particular system for which treatment is desired and will be influenced by factors such as pH, temperature, water quality, and the respective concentration in the water of potential scale and deposit forming species. For the most part, the composition (I)/(II) will be effective when used at a total level (as solids) from about 0.1 to 500 part per million of water in the system being treated. The weight percent ratio of (I):(II) in the treatment may fall with in the range of 95:5 to 5:95, preferably from 75:25 to 25:75.

In addition to the above noted composition (I)/(II) it has been also found that composition (I) alone can be utilized in the present invention if it is a poly[isopropenylphosphonic acid], especially if prepared according to the teachings of Cady et al. U.S. Pat. No. 5,519,102.

The composition (I)/(II) (including by definition composition (I) alone as stated previously) of the present invention can be employed in combination with conventional water treatment agents known to those skilled in the art including, but not limited to, dispersing agents such as copolymers of diisobutylene, threshold organic phosphonates inhibitors such as hydroxyethylidenediphosphonic acid, precipitating agents such as phosphates and polyphosphoric acids, corrosion inhibitors such as triazoles, antifoams, and biocides, sequestering agents such as citric acid and ethylenediamine tertraacetic acid.

When the composition (I)/(II) of the present is added to the aqueous system in combination with additional components, the individual additives may be added separately as in the form of an aqueous solution. The additives may be added either continuously or intermittently. Alternatively, the composition (I)/(II) may be blended with the above noted conventional water treatment agents and added, in the form of an aqueous solution, to the aqueous system either continuously or intermittently.

EXAMPLES

The present invention will now be further described with reference to a number of specific examples that are to be regarded solely as illustrative and not restricting the scope of the present invention.

Example 1

Sample 1(a) Preparation

To a suitable reactor equipped with a thermocouple, water-cooled condenser, overhead stirrer, nitrogen sparge and addition ports was charged DI water (42.94 g) and vinylphosphonic acid (Rhodia VPA, 76.5%, 55.73 g, 0.3946 mole) which was purged of oxygen with nitrogen and heated to 85±2° C. A separate initiator solution was prepared by dissolving sodium persulfate (3.76 g, 0.0158 mole) in DI water (11.28 g). Acrylic acid (AA, 28.44 g, 0.3946 mole) and the initiator solution were then uniformly charged drop wise to the reactor over a 240-minute period via separate addition ports to yield a 50 wt. % solution of the monomers as the free acids. After addition, the reactor contents were heated to 95±2° C. and held for 90-minutes. The resulting product was then cooled to room temperature, adjusted to pH 5±0.5 with aqueous caustic, and then adjusted to 35±1 wt. % solids with DI water. The con-version of the VPA was estimated to be 74 mole % via $^{31}$P NMR, the acrylic acid conversion was to be essentially quantitative via $^{13}$C NMR.

Example 2

Sample 2(a) Preparation

As in Example 1(a) except methacrylic acid (MAA) was substituted for acrylic acid on an equal molar basis, the persulfate charge was increased to 5 mole % of the total monomer charge, the MAA feed was extended to 300-minutes and the initiator feed was staggered over 420-minutes (50% uniformly feed over 300-minutes and then 50% uniformly feed over 120-minutes), and the reaction solids as free acid concentration after the MAA and initiator solution feed was decreased to 40 wt. %. The conversion of the VPA estimated to be 67 mole % via $^{31}$P NMR, the methacrylic acid conversion was to be essentially quantitative via $^{13}$C NMR.

Example 3

Sample 3(a) Preparation

As in Example 1(a) except only VPA was used as the monomer, the persulfate charge was increased to 5 mole % of the total monomer charge, the reaction temperature was increased to 95±2° C., the initiator feed was extended top 600-minutes, and the pH was adjusted to 3.5±0.5. The conversion of the VPA estimated to be 64 mole % via $^{31}$P NMR.

TABLE 1

Sample Summary

| Sample | Description |
|---|---|
| 1(a) | 1:1 Copolymer of AA and VPA |
| 2(a) | 1:1 Copolymer of MAA and VPA |
| 3(a) | VPA Homopolymer |
| 4(a) | AA/VPA Copolymer: Rhodia ALBRITECT ® CP-30 |
| 5(a) | PIPPA Prepared in a similar fashion to Ex. 2 of U.S. Pat. No. 4,446,046 |
| 6(a) | PIPPA Prepared in a similar fashion to Ex. 1 of U.S. Pat. No. 5,519,102 |
| 1(b) | Maleic Polymer: BASF SOKALAN ® PM 10 I |
| 2(b) | Maleic Polymer: Ciba-Geigy BELCLENE ® 283 |
| 3(b) | Maleic Polymer: Rohm and Haas ACUMER ® 4210 |
| 4(b) | Maleic/Acrylic Copolymer: ALCO Chemical AQUATREAT ® AR-978 |
| 5(b) | ALCO Chemical AQUATREAT ® AR-935 |
| 6(b) | Maleic Polymer: ALCO Chemical AQUATREAT ® AR-801 |
| 731 | Rohm and Haas TAMOL ™ 731 Dispersant |
| AA/S | GE Water Technologies AA/AOHPS Copolymer Dispersant |
| 2060 | Solutia DEQUEST 2060: Diethylenetriaminepenta(methylenephosphonic acid) |
| 2010 | Solutia DEQUEST 2010: (Hydroxyethylidene)diphosphonic acid |
| V-1 | ALCO Chemical Versaflex ® ONE |

AA = Acrylic Acid
VPA = Vinylphosphonic Acid
PIPPA = Poly[isopropenylphosphonic acid]
AOHPS = 3-Allyloxy-2-hydroxypropylsulfonic Acid Example 4

Magnesium Hydroxide Static Screening

The following solutions were prepared in DI water: Solution A containing 36.380 g/L magnesium chloride hexahydrate and 40.696 g/L sodium chloride; Solution B containing 0.333 g/L sodium bicarbonate, 40.696 g/L sodium chloride, and 0.200 g/L sodium hydroxide; and Solution C containing 40.696 g/L sodium chloride. The combination of equal parts of Solution A and Solution B yield a solution comprised of ~4,500 ppm $Mg^{+2}$ as $CaCO_3$, ~100 ppm $CO_3^{-2}$ as $CaCO_3$, ~16,000 ppm $Na^+$, and ~30,000 ppm $Cl^-$. All test samples were also diluted to 0.20 wt. % actives in DI water for addition to the test solutions for screening.

To a 125 mL polypropylene (Nalgene) bottle is charged 50 mL of Solution B, the desired amount of sample solution(s), and then 50 mL of Solution A to yield the "sample" solution. To a separate 125 mL polypropylene (Nalgene) bottle is charged 50 mL of Solution B and then 50 mL of Solution C to yield the "stock" solution. The bottles are sealed, ¾ immersed in a water bath at 93° C., and held for 24-hours with shaking to accenuate scale formation. At the completion of the hold period the samples are immediately processed through a 0.22-micron filter. The isolated filtrate is cooled to room temperature within a 2-hour period and then analyzed for alkalinity (M-alk). All test are conducted in duplicate. A sample of stock solution that is not heated is also processed for analysis. The M-alk of equal parts of Solution A plus Solution B without treatment is also measured as the "control" sample. The percent inhibition is then calculated by Equation I.

$$\% \text{ Inhibition} = \frac{(M\text{-}alk \text{ Sample} - M\text{-}alk \text{ Control})}{(M\text{-}alk \text{ Stock} - M\text{-}alk \text{ Control})} *100 \quad \text{Equation I}$$

Table 2 summarizes the test results for screening additives as standalone treatments. Sample designations ending in "(a)" are exemplary of a water-soluble polymeric phosphonate (a) of the present invention. Sample designations ending in "(b)" are exemplary of a water-soluble polycarboxylate (b) of the present invention. Sample designations devoid of one of the aforementioned endings are (for the purpose of the examples) exemplary of conventional water treatment agents that can be employed in combination with the composition (a)/(b) of the present invention. In this testing it was observed that the maximum % inhibition obtained without the use of acid feed was 42%. It was also noted that poly[isopropenylphosphonic acid] (PIPPA) prepared according to the method of Cady et al. U.S. Pat. No. 5,519,102 (Sample 6(a), persulfate initiated, Mw 1300) was significantly more effective than PIPPA prepared by Example 2 of U.S. Pat. No. 4,446,046 (Sample 5(a), benzoyl peroxide initiated, Mw 6800). In addition, the efficacy of Sample 6(a) as a standalone treatment is comparable in efficacy to the industry benchmark maleic-based polymer Sample 1(b).

TABLE 2

Standalone Treatment

| Sample | % Inhibition | | |
|---|---|---|---|
| | 10 ppm | 15 ppm | 20 ppm |
| 5(a) | 13 | 15 | 14 |
| 6(a) | 25 | 35 | 40 |
| 1(b) | 40 | 41 | 42 |
| 2(b) | 39 | 40 | 40 |
| 3(b) | 24 | 49 | 26 |
| 4(b) | 20 | 25 | 37 |
| 5(b) | 27 | 30 | 38 |
| 731 | 0 | 23 | 24 |
| 2060 | 24 | 28 | 32 |

Table 3 summarizes screening results for the composition (I)/(II) of the present invention. In this testing it is observed that the maximum inhibition obtained without acid feed is significantly increased. Particular preferred are combinations of (I) PIPPA prepared via an aqueous polymerization technique (Sample 6(b)) in combination with the (II) maleic acid based water-soluble polycarboxylates (Samples 1(b) to 3(b), and 6(b)).

TABLE 3

Composition (a)/(b)
% Inhibition

| Sample #I | ppm #I | Sample #II | ppm #II | Sample #III | ppm #III | % Inhib. |
|---|---|---|---|---|---|---|
| 6(a) | 10 | 1(b) | 10 | — | — | 60 |
| 6(a) | 10 | 1(b) | 10 | 731 | 1.5 | 60 |
| 6(a) | 10 | 1(b) | 10 | AA/S | 1.5 | 51 |
| 6(a) | 6.7 | 2(b) | 13.3 | — | — | 37 |
| 5(a) | 10 | 2(b) | 10 | 731 | 1.5 | 30 |
| 6(a) | 10 | 2(b) | 10 | 731 | 1.5 | 66 |
| 6(a) | 10 | 2(b) | 10 | 731 | 1.0 | 59 |
| 6(a) | 10 | 2(b) | 10 | AA/S | 1.5 | 50 |
| 1(a) | 6.7 | 3(b) | 13.3 | — | — | 58 |
| 2(a) | 6.7 | 3(b) | 13.3 | — | — | 44 |
| 3(a) | 6.7 | 3(b) | 13.3 | — | — | 42 |
| 4(a) | 6.7 | 3(b) | 13.3 | — | — | 43 |
| 5(a) | 6.7 | 3(b) | 13.3 | 731 | 1.5 | 37 |
| 6(a) | 6.2 | 3(b) | 12.3 | — | — | 36 |
| 6(a) | 6.2 | 3(b) | 12.3 | 731 | 1.5 | 57 |
| 6(a) | 6.7 | 3(b) | 13.3 | — | — | 56 |
| 6(a) | 6.7 | 3(b) | 13.3 | 731 | 1.5 | 66 |
| 6(a) | 6.7 | 3(b) | 13.3 | AA/S | 1.5 | 48 |
| 6(a) | 5 | 3(b) | 15 | 731 | 1.5 | 25 |
| 6(a) | 19 | 3(b) | 9.5 | — | — | 102 |
| 6(a) | 19 | 3(b) | 9.5 | 731 | 1.5 | 95 |
| 6(a) | 6.7 | 4(b) | 6.7 | — | — | 19 |

Example 5

Dynamic Scale Control Screening

Synthetic seawater was prepared according to *Standard Methods for the Examination of Water and Wastewater*, Greenberg A. E. et al., Ed., 18th Edition (1992), utilizing reagent grade calcium chloride dihydrate, sodium bicarbonate, magnesium chloride hexahydrate, sodium fluoride, strontium chloride hexahydrate, potassium bromide, potassium chloride, boric acid, sodium sulfate, sodium silicate monohydrate, and double distilled water. Ion concentrations in solution were determined by inductively coupled plasma atomic emission spectroscopy (ICP).

The dynamic scale control screening was conducted employing a Single Stage Flash Distillation Unit (SFDU) that simulates a Multiple Stage Flash distillation process (MSF). The SFDU provides a realistic laboratory measure of the ability of a treatment program to prevent scale formation under heat transfer conditions. In the evaluation the synthetic seawater is circulated through exchanger tubes heated by steam. After passing through the exchanger, water is allowed to flash under vacuum in a flash chamber. Adjusting the ratio of seawater feed to blow down controls the concentration factor. The SDFU is also designed to allow monitoring and automatic control of the process temperatures, pH, and conductivity. Rinsing the surface of the tubes with an acid solution, followed by an ethylenediaminetetraacetic acid rinse, and then analyzing the rinse solutions by ICP determine the amount of deposit formed on the heat exchanger.

Table 4 summarizes screening results for the composition (I)/(II) of the present invention without pH control in the SDFU relative to a control (no treatment nor pH control) and acid feed (sulfuric acid to maintain pH 8.0-8.1). This testing demonstrates that the compositions of the present invention are effective at inhibiting scale formation.

TABLE 4

Composition (a)/(b)
Milligrams Deposit

| Sample #I | ppm #I | Sample #II | ppm #II | Sample #III | ppm #III | Sample #IV | ppm #IV | Mgs Deposit |
|---|---|---|---|---|---|---|---|---|
| Control | — | — | — | — | — | — | — | 380.5 |
| Acid | — | — | — | — | — | — | — | 13.96 |
| 6(a) | 0.768 | 3(b) | 1.536 | 2010 | 0.096 | 731 | 0.200 | 5.61 |
| 6(a) | 0.768 | 6(b) | 0.768 | V-1 | 0.320 | — | — | 5.92 |

Test Conditions: 90/10 Cu/Ni Tube Metallurgy, 26", ½" Diameter
57° C. Sump Temperature
118° C. Maximum Brine Temperature
Concentration Factor 1.5
0.3 gpm flow, 24-Hours It is noted that the foregoing examples have been provided merely for the purpose of explanation and are in no way to be construed as limiting of the present invention.

In one aspect, the invention pertains to methods for inhibiting scale formation of structural parts in contact with an aqueous salt containing medium in a desalination process. A treatment comprising a phosphono functional polymer (I) is added to such medium in an amount of from about 1-500 ppm. The phosphono functional polymer (I) comprises a repeat unit formed from polymerization of an ethylenically unsaturated monomer B that includes the phosphono function. In one exemplary embodiment, monomer B is selected from vinyl phosphonic acid, isopropenyl phosphonic acid, isopropenylphosphonic anhydrides, allylphosphonic acid, vinyl benzyl phosphonic acid, (meth)acrylamidoalkylphosphonic acids and allylalkylethers and allylhydroxyalkyl ethers of such acids.

In another embodiment, the phosphono functional polymer (I) includes at least a second repeat unit formed from polymerization of a non phosphonate monomer F such as carboxylate monomers (i), sulfonate containing monomers (ii), amides (iii), and allyl ethers and sulfonated and phosphate allyl ethers (iv). Exemplary carboxylate monomers (i) include acrylic acid, meth acrylic acid, vinyl acetate, allyl acetic acid, fumaric acid, maleic acid or anhydride, itaconic acid, etc.

Exemplary sulfonate containing monomers (ii) include 2-acrylamido-2-methylpropylsulfonic acid, 2-methacrylamido-2-methylpropylsulfonic acid, styrene sulfonic acid, vinyl sulfonic acid, vinylbenzyl sulfonic acid, allylbenzyl sulfonic acid, sulfo alkyl acrylate or methacrylate, allyl or methallyl sulfonic acid, sulfonic acid acrylate, 3-methacrylamido-2-hydroxypropyl sulfonic acid, their salts and mixtures thereof.

Exemplary amide monomers (iii) include acrylamide, acrylamido glycolic acid, methacrylamide, and N alkyl acrylamides such as t-butyl acrylamide.

The second repeat unit can also have a repeat unit formed from an allyl ether or sulfonated allyl ether (iv) such as 3-allyloxy-2-hydroxypropyl sulfonic acid.

As stated above, the treatment of the invention may optionally include a polycarboxylate polymer (II) preferably, polymaleic acid or anhydride homopolymers and copolymers.

In another embodiment of the invention, the phosphonate polymer (I) includes a repeat unit B of the structure

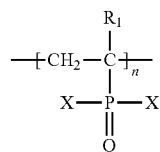

wherein $R_1$ is H, or lower alkyl of from 1 to 6 carbon atoms and wherein X is OH or OM wherein M is a cation. The value of n is selected such that the Mw of the polymer ranges from about 500 to 50,000. Preferably, I is poly(isopropenyl phosphonic acid) or poly(vinyl phosphonic acid).

The phosphonate polymer (I) can also comprise a repeat unit F of the structure

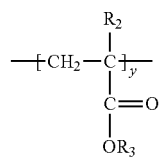

wherein $R_2$ is H or $CH_3$, and $R_3$ is H or a cation. As noted above, the molar ratio of repeat units B:F may fall within the range of 100:0 to 5:95, so that the number ratio of n:y may also fall within the range of 100:0 to 5:95. The values of y and n are selected such that the Mw of the polymer ranges from about 500 to 50,000. Repeat units formed via polymerization of acrylic acid or methacrylic acid monomers are preferred.

As set forth above, preliminary data suggests that the treatment in accordance with the invention, I, or I and II, is effective in inhibiting $Mg(OH)_2$ scale that would normally form along structural components of a desalination system that are in contact with the salt laden aqueous medium.

At present, the preferred treatment comprises poly(isopropenyl phosphonic acid) (I); ALCO Chemical AQUATREAT® AR-801 maleic-based polymer (II); and ALCO Chemical Versaflex® ONE.

While the present invention has been described with reference to an exemplary embodiment, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein, rather, the present invention extends to all functionally equivalent structures, methods and uses, such as are within the scope of the appended claims.

What is claimed is:

1. Method for inhibiting magnesium hydroxide scale formation on structural parts in contact with an aqueous salt containing medium in a desalination system comprising:
    adding to said aqueous salt containing medium in the system a treatment without acid addition, said treatment comprising
    (a) a phosphono functional polymer I including a repeat unit of the structure

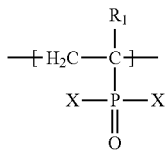

wherein $R_1$ is H or lower alkyl of from about 1 to 6 carbon atoms and wherein X is OH, or OM wherein M is a cation; and wherein Mw for the phosphono functional polymer (I) ranges from about 500 to 50,000 and wherein the phosphono functional polymer (I) was prepared by aqueous polymerization;
  b) a maleic-acid based carboxylate containing polymer scale inhibiting agent; and
  c) a dispersant;
  wherein said aqueous salt containing medium comprises magnesium cations and hydroxide anions under conditions in which, in absence of treatment, $Mg(OH)_2$ scale would form on said structural parts;
  whereby the method inhibits formation of $Mg(OH)_2$ scale on the structural parts of the desalination system.

2. Method as recited in claim 1 wherein said phosphono functional polymer I comprises a second repeat unit formed from polymerization of a nonphosphonate monomer (F).

3. Method as recited in claim 2 wherein said non phosphonate monomer (F) is a member selected from the group consisting of (i) carboxylate monomers, (ii) sulfonate monomers, (iii) amides, and (iv) allylethers and sulfonate and phosphate allyl ethers.

4. Method as recited in claim 3 wherein said non phosphonate monomer (F) is a carboxylate monomer, said phosphono functional polymer I and carboxylate polymer II being added to said aqueous medium in a combined amount I and II of about 1-500 ppm.

5. Method as recited in claim 1 wherein said phosphonate phosphono functional polymer I is poly(isopropenylphosphonic acid).

6. Method as recited in claim 1 wherein said phosphono functional polymer I is poly(vinylphosphonic acid).

7. Method as recited in claim 1 wherein said phosphono functional polymer (I) comprises a copolymer having a repeat unit (F) of the structure

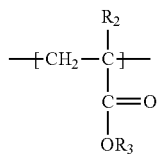

wherein $R_2$ is H or $CH_3$, and $R_3$ is H or a cation.

8. Method of inhibiting magnesium hydroxide scale formation in a desalination system in which an aqueous salt containing medium is brought into contact with system equipment, comprising adding to said aqueous medium a treatment without acid addition comprising
  a) polymer of isopropenylphosphonic acid, wherein the polymer of isopropenylphosphonic acid was prepared by aqueous polymerization;
  b) a carboxylate containing polymer of maleic acid and its salts and anhydride scale inhibiting agent,
  c) a dispersant; and optionally a
  e) phosphonate;
  wherein said aqueous salt containing medium comprises magnesium cations and hydroxide anions under conditions in which, in absence of treatment, $Mg(OH)_2$ scale would form on said system equipment; and
  whereby the method inhibits formation of $Mg(OH)_2$ scale on the system equipment of the desalination system.

* * * * *

UNITED STATES PATENT AND TRADEMARK OFFICE
CERTIFICATE OF CORRECTION

| | |
|---|---|
| PATENT NO. | : 7,862,727 B2 |
| APPLICATION NO. | : 10/597925 |
| DATED | : January 4, 2011 |
| INVENTOR(S) | : Blandford et al. |

It is certified that error appears in the above-identified patent and that said Letters Patent is hereby corrected as shown below:

In Column 2, Line 10, delete "telemetric" and insert -- telomeric --, therefor.

In Column 2, Line 30, delete "sequestrants." and insert -- sequestrant. --, therefor.

In Column 2, Line 50, delete "deslination" and insert -- desalination --, therefor.

In Column 3, Line 65, delete "thereof," and insert -- thereof; --, therefor.

In Column 4, Line 58, delete "4210;" and insert -- 4210, --, therefor.

In Column 5, Line 10, delete "(I)/(II)" and insert -- (I)/(II), --, therefor.

In Column 5, Line 27, delete "tertraacetic" and insert -- tetraacetic --, therefor.

In Column 8, Line 62, delete "SDFU" and insert -- SFDU --, therefor.

In Column 9, Line 3, delete "SDFU" and insert -- SFDU --, therefor.

In Column 10, Line 55, delete "herein," and insert -- herein; --, therefor.

In Column 12, Line 1, in Claim 5, after "said" delete "phosphonate".

Signed and Sealed this
Tenth Day of April, 2012

David J. Kappos
*Director of the United States Patent and Trademark Office*